(12) United States Patent
Dizon

(10) Patent No.: US 10,701,785 B2
(45) Date of Patent: Jun. 30, 2020

(54) NETWORKED LIGHTING COMMUNICATION SYSTEM

(71) Applicant: Valley Business Solutions LLC, Huntsville, AL (US)

(72) Inventor: Alexander Le Dizon, Rogersville, AL (US)

(73) Assignee: Valley Business Solutions, LLC, Huntsville, AL (US)

( * ) Notice: Subject to any disclaimer, the term of this patent is extended or adjusted under 35 U.S.C. 154(b) by 0 days.

(21) Appl. No.: 16/360,728

(22) Filed: Mar. 21, 2019

(65) Prior Publication Data

US 2019/0297708 A1  Sep. 26, 2019

Related U.S. Application Data

(60) Provisional application No. 62/646,731, filed on Mar. 22, 2018.

(51) Int. Cl.
*H05B 33/00* (2006.01)
*H05B 47/18* (2020.01)
(Continued)

(52) U.S. Cl.
CPC ............ *H05B 47/18* (2020.01); *H04L 12/10* (2013.01); *H05B 47/185* (2020.01)

(58) Field of Classification Search
CPC ............ G05B 15/02; G05B 2219/2642; G05B 2219/163; G05B 19/04; G05B 2219/25011; G05B 19/042; G05B 11/01; G05B 19/0426; G05B 19/058; G05B 2219/25168; G05B 2219/31198; H05B 37/0272; H05B 37/0218; H05B 37/0227; H05B 37/0245; H05B 33/0845; H05B 33/0857; H05B 37/0254; H05B 37/0263; H05B 37/02; H05B 37/029; H05B 33/0854; H05B 33/0815; H05B 33/0872; H05B 33/0863; H05B 33/0869; H05B 37/0236; H05B 33/0803; H05B 33/0809; H05B 33/0827; H05B 33/0842; H05B 33/089; H05B 37/03; H05B 37/0209; H05B 37/028

See application file for complete search history.

(56) References Cited

U.S. PATENT DOCUMENTS 7,597,455 B2  10/2009  Smith
7,598,684 B2  10/2009  Lys
(Continued)

OTHER PUBLICATIONS

Maury Wright & Carrie Meadows, PoE Bridges Connectivity, Control, and Cost Benefits of Smart Lighting—LEDs, PoE Bridges Connectivity, Control, and Cost Benefits of Smart Lighting, Mar. 8, 2017, pp. 1-4, vol. 14, Issue 3, PennWell Corporation, Tulsa, Oklahoma.

*Primary Examiner* — Monica C King
(74) *Attorney, Agent, or Firm* — Dennen IP Law, LLC

(57) ABSTRACT

The present disclosure is a system that has a network comprising a power over ethernet switch and at least one light communicatively coupled to the network via the POE switch such that the at least one light receives power from the POE switch. Further, the system comprises a processor configured for transmitting power and light control data to the at least one light over the network via the POE, the light control data comprising commands for changing the color of the at least one light.

15 Claims, 8 Drawing Sheets

(51) Int. Cl.
*H04L 12/10* (2006.01)
*H05B 47/185* (2020.01)

(56) References Cited

U.S. PATENT DOCUMENTS

| | | |
|---|---|---|
| 8,368,325 B2 | 2/2013 | Kim |
| 8,531,135 B2 | 9/2013 | Park |
| 8,742,686 B2 | 6/2014 | Zampini, II |
| 8,860,561 B2 | 10/2014 | Ellis |
| 9,295,142 B1 | 3/2016 | Leinen et al. |
| 9,408,282 B1 | 8/2016 | Springer |
| 9,671,072 B1 | 6/2017 | May |
| 2007/0273290 A1 | 11/2007 | Ashdown |
| 2008/0197790 A1 | 8/2008 | Mangiaracina |
| 2010/0190455 A1 | 7/2010 | Hashizume |
| 2018/0018866 A1 | 1/2018 | Carlin et al. |
| 2019/0035569 A1* | 1/2019 | Sadwick ................ H01H 9/287 |

* cited by examiner

NETWORKED LIGHTING COMMUNICATION SYSTEM

CROSS REFERENCE TO RELATED APPLICATION

This application claims priority to U.S. Provisional Patent Application Ser. No. 62/646,731 entitled Networked Lighting Communication System and filed on Mar. 22, 2018, which is incorporated herein by reference.

BACKGROUND

For safety, many communication methods have been employed in schools, universities, stadiums, dorms, apartments, commercial buildings, assisted living communities, multi-building campuses, daycare centers and other locations where it is imperative to communicate to individuals spread out throughout the locations. In this regard, it may be desirable to communicate that there is an intruder, to vacate the premises, or a severe weather alert. It may also be desirable to communicate that all is clear or that fire alarms are merely being tested.

Typically, alerts of this type are broadcast a number of ways. For example, many locations employ fire alarms to warn of fires, security alarms to warn of security threats, gas monitoring systems, water leak notification systems, weather alert systems, and the like. Threats may be communicated to individuals through text messaging, automated phone calls, paging systems, audible alarms, and the like.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views. The present disclosure contains at least one drawing executed in color. Copies of this patent or patent application publication with color drawing(s) will be provided by the Office upon request and payment of the necessary fee

DETAILED DESCRIPTION

The present disclosure describes a networked lighting communication systems that uses networked, controllable lighting to signify and notify people of a current or eminent event to be acted upon. The networked lighting communication system comprises a network of a plurality of network devices. Some network devices include a server device, a computing device, a wireless access point, a device controller coupled to and configured for controlling a plurality of lights in serial communication and a device controller coupled to and configured for controlling a plurality of lights in parallel communication. Note that a wireless device may access the network via a wireless access point.

In operation, the lights are deployed throughout a building or throughout multiple buildings on a campus setting. Over the network, a user, using a wall switch, a computing device or a wireless device (light controlling devices) can control the color and intensity of the lights deployed. Note that a wireless device may be, for example, a laptop, a tablet, or a handheld device. As noted, a plurality of lights is controlled by a device controller. Thus, using one of the light controlling devices, a user may communicate with the device controllers and change the color and intensity of the lights through the device controllers.

In this regard, management logic resides on the server, and a processor residing on the server executes the instructions of the management logic. The management logic can be hardware, software, firmware, or any combination thereof. The management logic receives data from one of the light controlling devices that comprises data indicative of color and intensity based upon a user input. The management control logic residing on the server transmits an instruction set over the network to the device controllers to control the color of the lights. Note that an instruction set is a group of commands for controlling the lights. Notably, a particular color can have a particular meaning to those viewing the lights. For example, orange lights may indicate an intruder in the building or on the campus, red may indicate vacate premises, green may indicate all clear, blue may indicate severe weather alert, and purple may indicate that the fire alarms are being tested.

Figure 1:
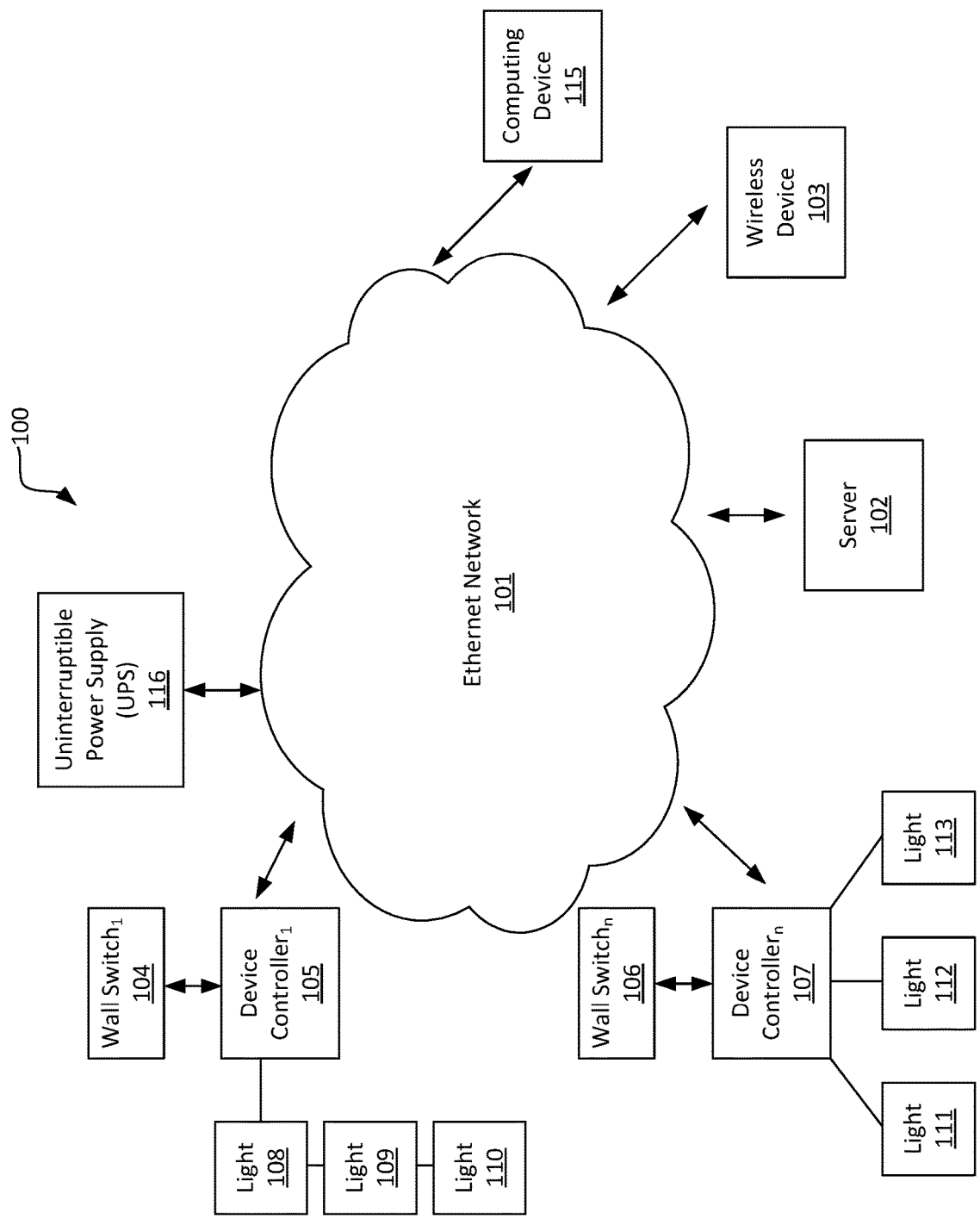
FIG. 1 is an exemplary networked lighting communication system in accordance with an embodiment of the present disclosure.

FIG. 1 depicts an exemplary networked lighting communication system 100 in accordance with an embodiment of the present disclosure. The networked lighting communication system 100 comprises a plurality of lights 108-113. The plurality of lights 108-113 are controlled over a network 101. Note that the network 101 may be any type of network known in the art or future-developed. As an example, the network 101 may be a local area network (LAN).

A device controller 105 communicates with and controls the lights 108-110. Note that the device controller 105 is a network device having an internet protocol (IP) address. Also, an IP wall switch 104 is communicatively coupled to the device controller 105 for controlling the lights 108-110. In this regard, the device controller 105, upon receiving an instruction set from the management logic on the server 102 transmits the instruction set to the lights 108-110 to turn a certain color, e.g., red, or exhibit a certain intensity.

A device controller 107 communicates with and controls the lights 111-113. Note that the device controller 107 is a network device having an IP address. Also, an IP wall switch 106 is communicatively coupled to the device controller 107 for controlling the lights 111-113. Further note that the lights 111-113 are coupled to the device controller 107 in parallel. Thus, each light 111-113 may be controlled separately. For example, light 111 may receive instructions to turn red, whereas lights 112 and 113 may receive instructions to turn green.

Note that in one embodiment, the lights 108-113 are low-wattage. The lights 108-113 are also controllable multicolored lights, such as light emitting diodes (LEDs).

The networked lighting communication system 100 further comprises a processor on the server 102 that executes managements logic loaded on the server 102. The server 103 controls communication with the network devices, in particular with the device controller 105 and the device controller 107 over the network 101.

The networked lighting communication system 100 further comprises access devices such as the wall switches 104 and 106, the wireless device 103 and the computing device 115. Note that the wireless device 103 may be a laptop, a handheld device, or a tablet, for example.

In operation, a user, using the wireless device 103 or the computing device 115 can control the color and intensity of the lights 108-113. In this regard, a user may enter data into a graphical user interface (GUI) to change the color or intensity of the lights 108-113. This command referring to the change is transmitted to the management logic residing on the server 102 over the network 101. The management logic generates an instruction set to be sent to the device controllers 105 and/or 107 to control the color and intensity of the lights 108-113.

The wall switches 104 and 106 communicate directly with the device controllers 105 and 107, respectively. In this regard, the wall switches 104 and 106 have buttons (not shown) visually indicating colors, e.g., red, blue, green, or yellow. A user selects the button of the color he/she desires to communicate. The wall switches 104 and 106 transmit data indicating the color to the device controllers 105 and 107, respectively. The device controllers 105 and 107 then communicate the color to the lights 108-113, and the lights 108-113 display the color selected by the user.

The networked lighting communication system 100 further comprises an uninterruptible power supply (UPS) 116. The UPS 116 keeps the system 100 running in the event of a power loss. The UPS can be sized for a system based on the amount of time a user wants the system to remain powered in the event of a power outage.

Figure 2:
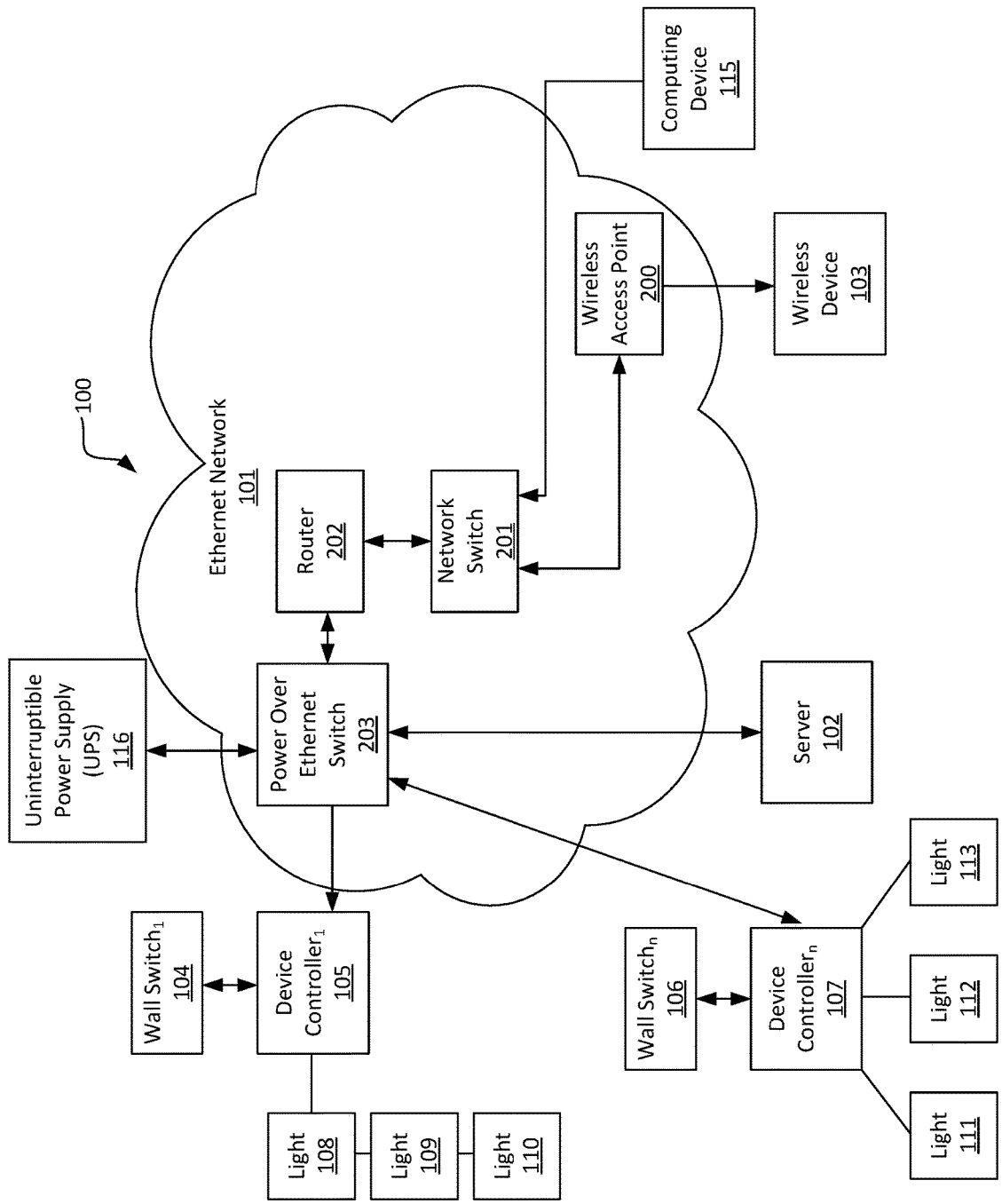
FIG. 2 is the networked lighting communication system of FIG. 1 showing the network components.

FIG. 2 is a diagram of the networked lighting communication system 100 showing additional exemplary networking components of the network 101. Note that the networked lighting communication system 100 in FIG. 2 comprises the lights 108-110 communicatively coupled to the device controller 105 and the lights 111-113 communicatively coupled to the device controller 107. The networked lighting communication system 100 also comprises the server 102, the wireless device 103, and the computing device 115. Each of the server 102, the wireless device 103, and the computing device 115 are configured for controlling the lights 108-113 either directly or indirectly. Additionally, the networked lighting communication system 100 comprises the UPS 116, which ensures that the networked lighting communication system 100 continues to have power if power is disrupted.

In addition to the devices described, the networked lighting communication system 100 comprises a network switch 201, a router 202, and a power over ethernet (POE) switch 203. Also, the networked lighting communication system 100 comprises the wireless access point 200.

In one embodiment, the router 202 may assign IP addresses to the various network devices. Notably, the router 202 may assign an IP address to the device controllers 105 and 107, the server, the wireless access point, and the computing device 115. In another embodiment, a user may manually assign an IP address to the various network devices through the server 102.

In operation, the wireless device 103 accesses the network 101 via the wireless access point (WAP). The WAP is any type of device that allows a wireless device to connect to a wired network, e.g., network 101. Via a GUI (not shown) displayed by the server 102 to the wireless device 103, a user selects a device controller 105 or 107. Further, the user selects a particular device controller 105 or 107 and a color from the GUI. Data indicative of a command for the device controller 105 or 107 and the selected color is transmitted to the management logic residing on the server 102 through the network 101.

Upon receipt of the command from the wireless device 103, the server 102 determines the network device, e.g., device controller 105 or 107, that is to receive the command. The server 102 then generates an instruction set identifying the device controller 105 or 107, e.g., via an IP address, and the selected color to the device controller 105 or 107 through the POE switch 203. The device controller 105 or 107 transmits the instruction set to the lights 108-113 to control the color and/or intensity of the lights 109-113.

Note that the POE switch 203 performs the functions of the network switch 201; however, additionally the POE switch 203 provides power to the device controllers 105 and 107 and the lights 108-113. In this regard, the POE switch 203 provides both power and data over an ethernet cable (not shown).

Further, the computing device 115 may be used to control the lights 108-113. The process is similar to the wireless device 103. In this regard, via a GUI (not shown) displayed by the server 102 to the computing device 115, a user selects a device controller 105 or 107 and a color from the GUI. Data indicative of a command, including an identifier of a device controller 105 or 107 and data indicative of a selected color and/or intensity is transmitted to the management logic residing the server 102 through the network 101.

Upon receipt of the command from the computing device 115, the management logic determines an identifier for the device controller 105 or 107. The server 102 then transmits the instruction set identifying the device controller 105 or 107 and the selected color to the device controller 105 or 107 through the POE switch 203. The device controller 105 or 107 transmit the instruction set to the lights 108-113 to control the color and/or intensity of the lights 109-113.

Figure 3:
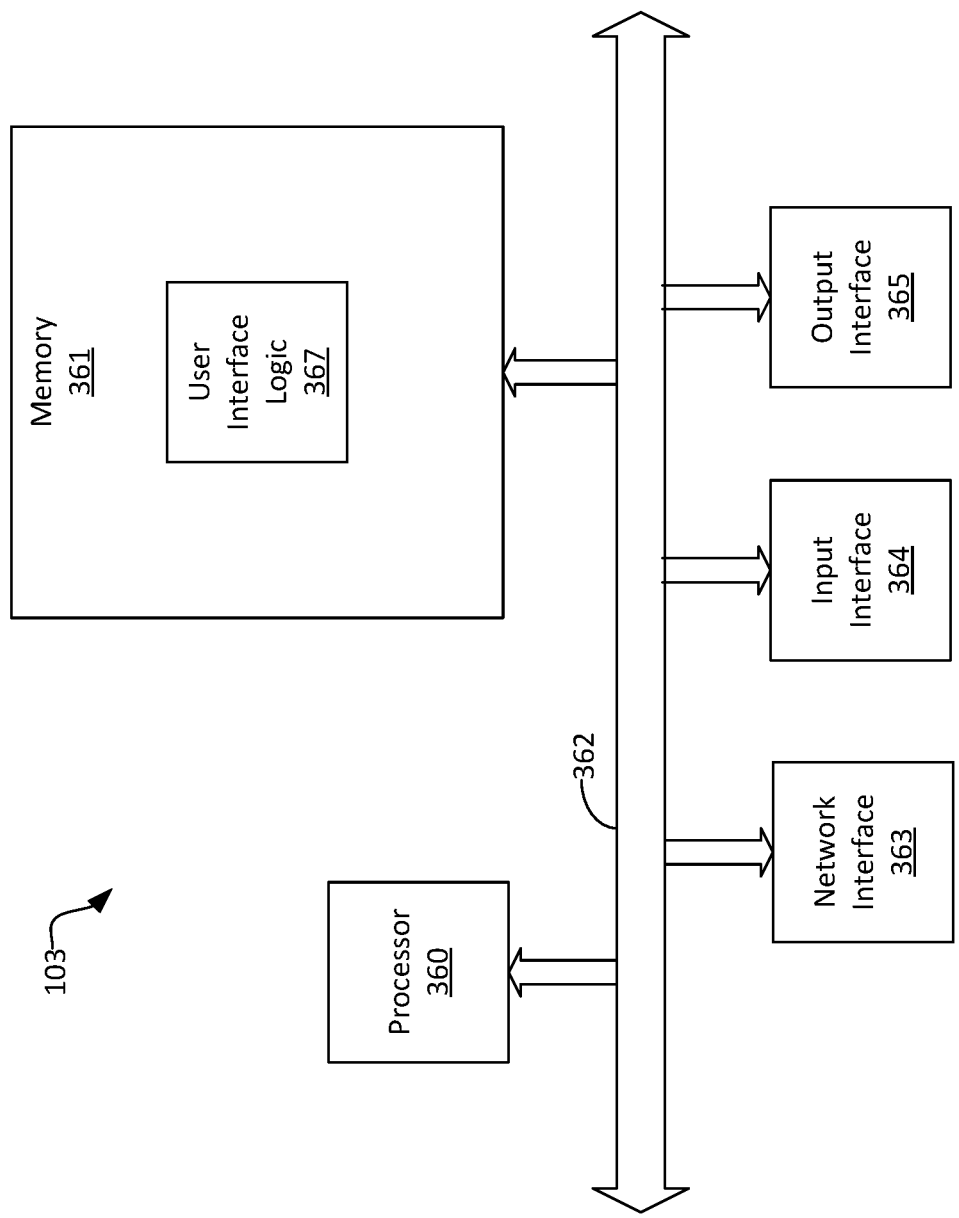
FIG. 3 is a block diagram of an exemplary wireless device as shown in FIG. 1.

FIG. 3 depicts an exemplary embodiment of the wireless device 103 depicted in FIG. 1. The wireless device 103 comprises a processor 360, a network interface 363, and memory 361. Stored in memory 361 is user interface logic 367 for receiving data from a user via an input interface 364 and sending data indicative of the data received to the server 102 (FIG. 1).

The exemplary embodiment of the wireless device 103 depicted by FIG. 3 comprises the at least one conventional processing element 360, such as a Digital Signal Processor (DSP) or a Central Processing Unit (CPU), that communicates to and drives the other elements within the wireless device 103 via a local interface 362, which can include at least one bus. Further, the processing element 360 is configured to execute instructions of software, such as the user interface logic 367.

It should be noted that the user interface logic 367 can be implemented in software, hardware, firmware or any combination thereof. In an exemplary embodiment illustrated in FIG. 3, the user interface logic 367 is implemented in software and stored in memory 361.

Note that the user interface logic 367, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The input interface 364, for example, a keyboard, keypad, or mouse, can be used to input data from a support/maintenance user of the wireless device 103, and an output interface 365, for example, a printer or display screen (e.g., a Liquid Crystal Display (LCD)), can be used to output data to the user.

In addition, a network interface 363, such as a Network Interface Card (NIC), enables the wireless device 103 to communicate with network components via the network 101. In the embodiment shown in FIG. 3, the network interface 363 would be a wireless interface that communicates through the wireless access point 200 (FIG. 2).

As an example of operation of the system 100, a user (not shown) logs onto the network 101 (FIG. 2) via a login screen displayed by the user interface logic 367 (FIG. 3). Once the user has logged onto the network 101, the management logic residing on the server 102 can display GUIs to the user to obtain information related to the networked lighting communication system 100.

Figure 4:
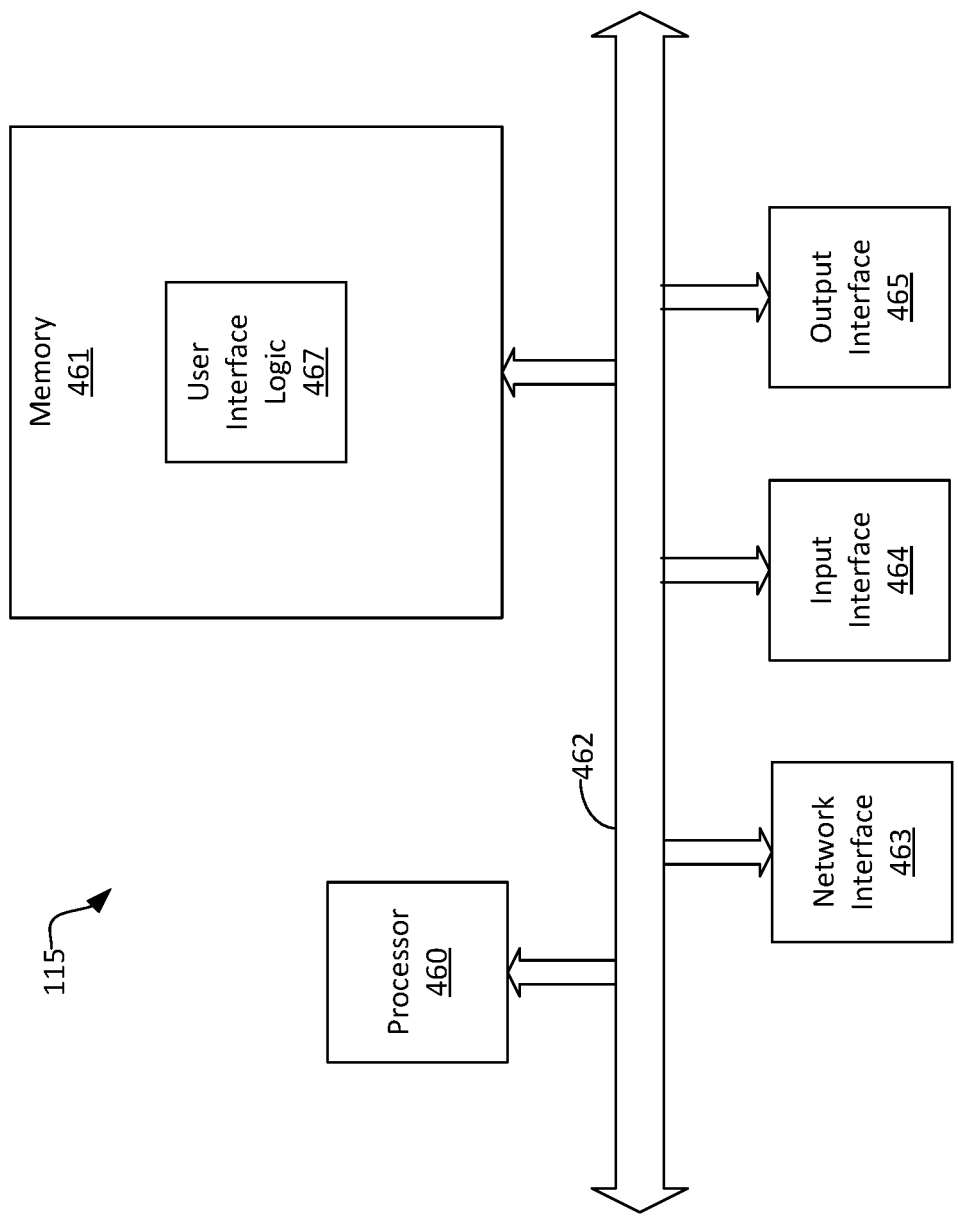
FIG. 4 is a block diagram of an exemplary computing device as shown in FIG. 1.

FIG. 4 depicts an exemplary embodiment of the computing device 115 depicted in FIG. 1. The computing device 115 comprises a processor 460, a network interface 463, and memory 461. Stored in memory 461 is user interface logic 467 for receiving data from a user via an input interface 364 and sending data indicative of the data received to the server 102 (FIG. 1).

The exemplary embodiment of the computing device 115 depicted by FIG. 4 comprises the at least one conventional processing element 460, such as a Digital Signal Processor (DSP) or a Central Processing Unit (CPU), that communicates to and drives the other elements within the wireless device 103 via a local interface 462, which can include at least one bus. Further, the processing element 460 is configured to execute instructions of software, such as the user interface logic 467.

It should be noted that the user interface logic 467 can be implemented in software, hardware, firmware or any combination thereof. In an exemplary embodiment illustrated in FIG. 4, the user interface logic 467 is implemented in software and stored in memory 461.

Note that the user interface logic 467, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The input interface 464, for example, a keyboard, keypad, or mouse, can be used to input data from a support/maintenance user of the wireless device 103, and an output interface 465, for example, a printer or display screen (e.g., a Liquid Crystal Display (LCD)), can be used to output data to the user.

In addition, a network interface 463, such as a Network Interface Card (NIC), enables the computing device 115 to communicate with network components via the network 101. In the embodiment shown in FIG. 4, the network interface 363 would be a device that connects the computing device 115 to the network 101.

As an example of operation, a user (not shown) logs onto the network 101 (FIG. 2) via a login screen displayed by the user interface logic 467 (FIG. 4). Once the user has logged onto the network 101, the management logic residing on the server 102 can display GUIs to the user to obtain information related to the networked lighting communication system 100.

Figure 5:
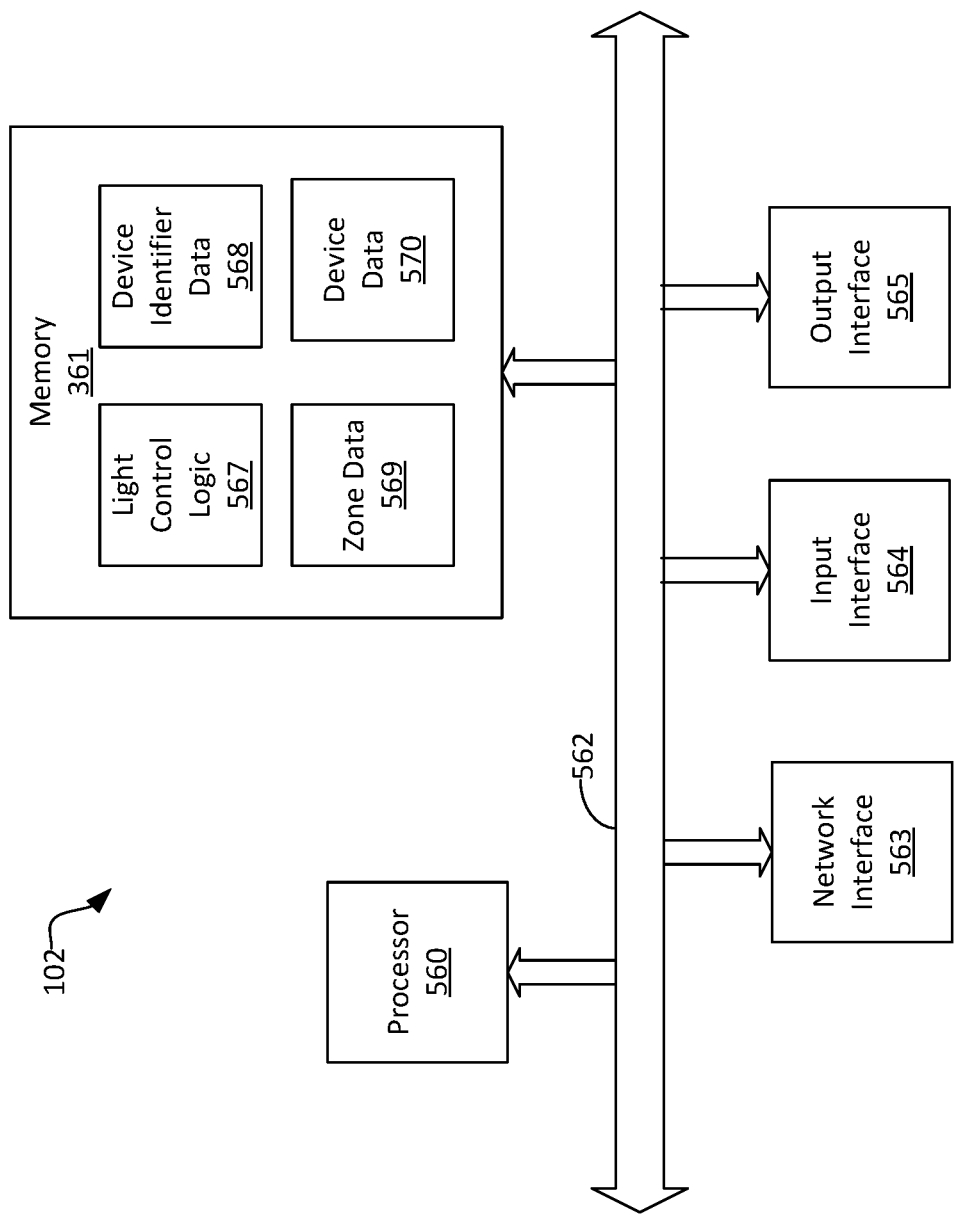
FIG. 5 is a block diagram of an exemplary server as shown in FIG. 1.

FIG. 5 depicts an exemplary embodiment of the server 102 depicted in FIG. 1. The server 102 comprises a processor 560, a network interface 563, and memory 561. Stored in memory 561 is light control logic 567, device identifier data 568, zone data 569, and device data 570.

The exemplary embodiment of the server 102 depicted by FIG. 5 comprises the at least one conventional processing element 560, such as a Digital Signal Processor (DSP) or a Central Processing Unit (CPU), that communicates to and drives the other elements within the server 102 via a local interface 562, which can include at least one bus. Further, the processing element 460 is configured to execute instructions of software, such as the light control logic 567.

It should be noted that the light control logic 567 can be implemented in software, hardware, firmware or any combination thereof. In an exemplary embodiment illustrated in FIG. 5, the light control logic 567 is implemented in software and stored in memory 561.

Note that the light control logic 567, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The input interface 564, for example, a keyboard, keypad, or mouse, can be used to input data from a support/maintenance user of the server 102, and an output interface 565, for example, a printer or display screen (e.g., a Liquid Crystal Display (LCD)), can be used to output data to the user.

In addition, a network interface 563, such as a Network Interface Card (NIC), enables the server 102 to communicate with network components of the network 101.

The zone data 569 comprises data indicative of each zone on the network 101 (FIG. 2). The zone data may include, for example, data indicative of zone names, zone locations, zone descriptions, scenes correlated with the zone, and the like. Further, the device data 570 may comprise data indicative of each device on the network 101. The device data may include, for example, data indicative of device names, device descriptions, device locations, and scenes correlated with the device.

In operation, the server 102 receives light control commands from an access device, e.g., wireless device 103 (FIG. 1) or computing device 115 (FIG. 1). The light control commands comprise data indicative of a network device and a color or other information related to the lighting, e.g., intensity. Based on the command, the light control logic 567 identifies the network device corresponding to the command via the device identifier data 568. The light control logic 567 sends the device identifier and the color data received in the command to the network device, e.g., device controller 105 or 107. The device controller 105 or 107 controls the color and intensity of the lights 108-113 based upon the data received from the server 102.

Figure 6:
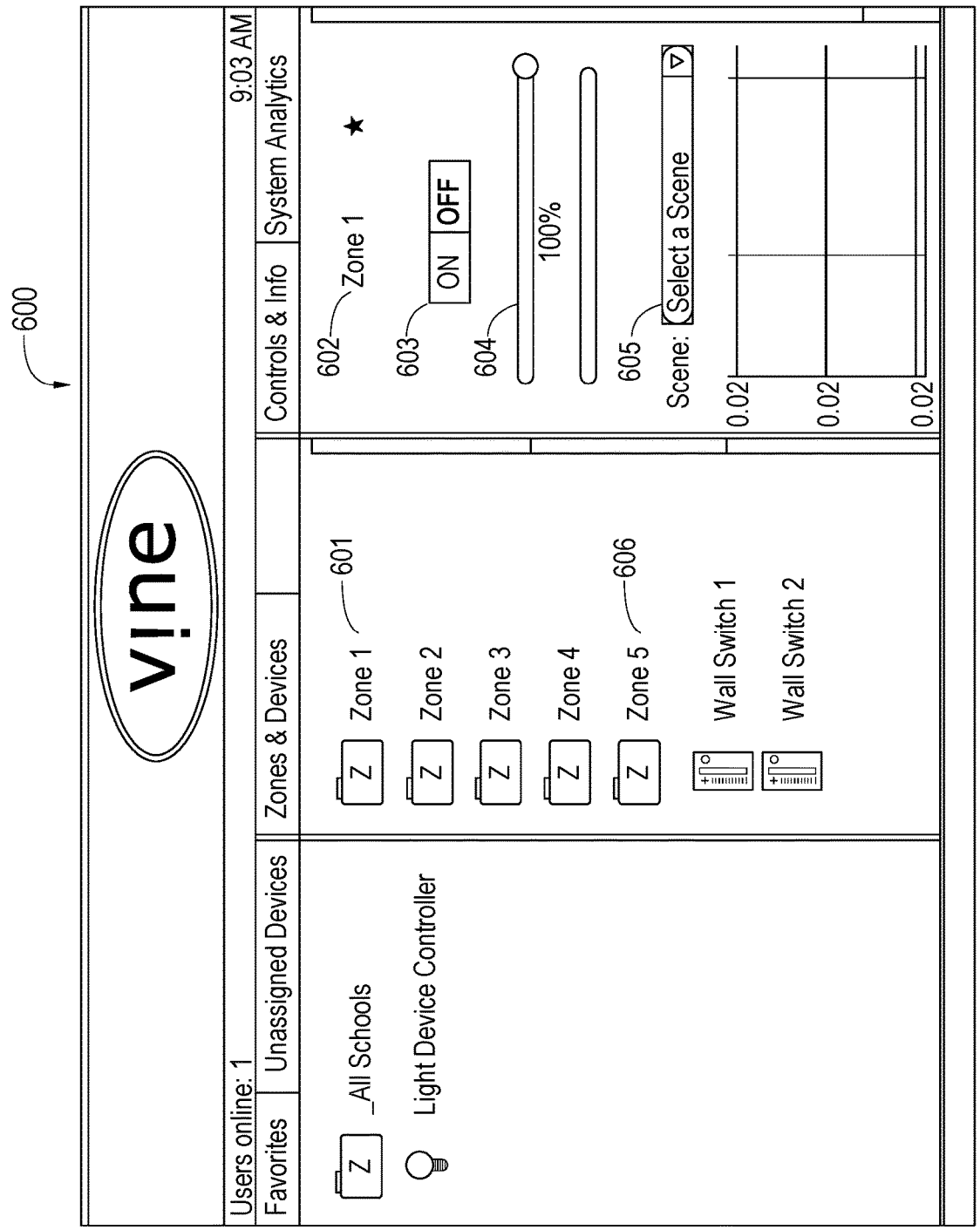
FIG. 6 is a home graphical user interface (GUI) of the system of FIG. 1.

FIG. 6 is a home GUI 600 in accordance with an embodiment of the present disclosure. The home GUI 600 may be displayed, for example, to the wireless device 103 (FIG. 2) or the computing device 115 (FIG. 2) by the user interface logic 367 or 467, respectively. The home GUI 600 comprises a "Zones & Devices" window 607 and a "Controls & Info" window 608.

In the "Zones & Devices" window 607 a listing of the zones and devices related to the network 101 (FIG. 2) to which the user logged in are listed. Note that a zone consists of one or more network devices. In one example, a zone may comprise the device controller 105 (FIG. 2) and the plurality of lights 108-110 (FIG. 2) communicatively coupled to the device controller 105. As another example, a zone may comprise the device controller 107 (FIG. 2) and the plurality of lights 111-113 (FIG. 2) communicatively coupled to the device controller 107. Further, the devices on the network 101 may be listed. For example, device controller 105 or device controller 107 may be listed.

In the list in window 607 there are a plurality of zones 601, including "Zone1," "Zone2," "Zone3," and "Zone4." Further listed is "Zone5" 606, which comprises two devices, including "Wall Switch 1" and "Wall Switch 2." Each zone may be controlled through the GUI 600.

In this regard, a user may select "Zone1" in the "Zones & Devices" window 607. When selected, "Zone1" appears as data 601 in the "Controls & Info" window 608. The user may turn "Zone1" on and off via the toggle button 603. Further, the user may select an intensity for the lights in the zone using the sliding button 604. In the example shown, the intensity is 100%. In pulldown menu "Select a Scene" 605, the user can identify a color for the lights in "Zone1." Note that this information is stored in the zone data 569 on server 102.

Once the user has entered data related to the lights in "Zone1" into the GUI 600, the user interface logic 367 or 467 of the wireless device 103 or the computing device 115, respectively, transmits a command to the server 102 (FIG. 2) identifying the zone and the color data, i.e., color and intensity. The light control logic 567 of the server 102 transmits data indicative of the command to the network device related to "Zone1," e.g., device controller 105 or 107. The device controller 105 or 107 then controls the lights, e.g., 108-113, based upon the command received from the server 102.

Figure 7:
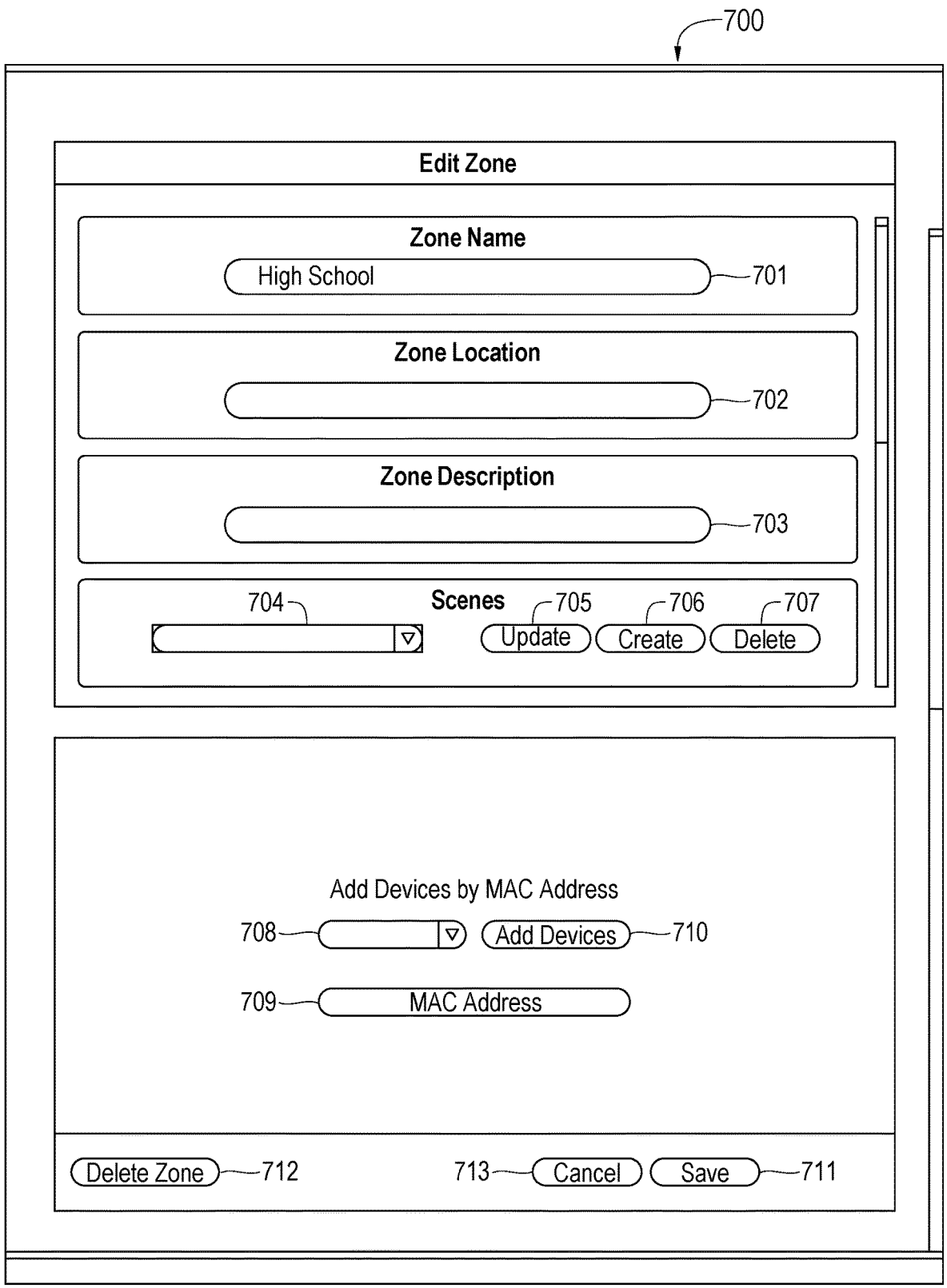
FIG. 7 is an "Edit Zone" GUI of the system of FIG. 1.

FIG. 7 is an "Edit Zone" GUI 700 in accordance with an embodiment of the present disclosure. The "Edit Zone" GUI 700 may be displayed by the user interface logic 367 or 467, for example, to the wireless device 103 (FIG. 2) or the computing device 115 (FIG. 2), respectively. The "Edit Zone" GUI 700 enables a user (not shown) to edit a previously created zone, which is stored in zone data 569 (FIG. 5). Note that a zone can comprise, for example, a device controller and the lights communicatively coupled to the device controller.

In text field 701 the user enters the name of the zone that the user desires to edit. Additionally, in text field 702, the user the zone location. A zone location is a word or phrase that identifies where physically the zone is located. For example, it might be "main building" or "building 1." This may prepopulate based upon the name of the zone entered. In text field 703, the user may enter data identifying the zone description. For example, the zone description may be "RGB" indicating any color or colors across the RGB spectrum.

In the "Edit Zone" GUI 700, the user may also update, create, and delete "Scenes." A "Scene" identifies colors for the lights on the network 101 (FIG. 2). In this regard, note that a scene is a predetermined snapshot of what the system exhibits at a particular time. The user can create a plurality of different scenes. In this regard, a user may select an existing scene from pulldown menu 704. The user then selects the "Update" button 705. Upon selection of the "Update" button 705, the user interface logic 367 (FIG. 3) or 467 (FIG. 4) displays a window (not shown) wherein the user can select different attributes for the existing scene.

Further, the user can create a scene. In this regard, the user may select the "Create" button 706. In response, the user interface logic 367 or 467 displays a window (not shown) wherein the user can select attributes for a new scene.

There is also a "Delete" button 707. If the user desires to delete a scene, he selects the scene he desires to delete from the pulldown menu 704. The user then selects the "Delete" pushbutton 707, and the light control logic 567 deletes the identified scene from the system.

The user can also add devices to the zone identified in text field 801. In this regard, the pulldown menu 708, when selected, shows the available devices. The user may select one of these devices from the pulldown menu and select the "Add Devices" button 710. The light control logic 566 adds the selected device to the zone identified in zone data 569.

The user can also add devices to the zone identified in text field 801 by entering the device's MAC address. Once the user has entered the MAC address, the user selects the "Add Device" button 710, and the light control logic 567 adds the device to the zone identified in zone data 569.

Once the user has made all desired changes, the user may select the "Save" button 711 to save the edited zone, which is saved in zone data 569. If the user desires to cancel the changes made to the zone, the user selects the "Cancel" button 713, and if the user desires to delete the identified zone, the user selects the "Delete" button 712. The zone data is then deleted from the zone data 569.

Figure 8:
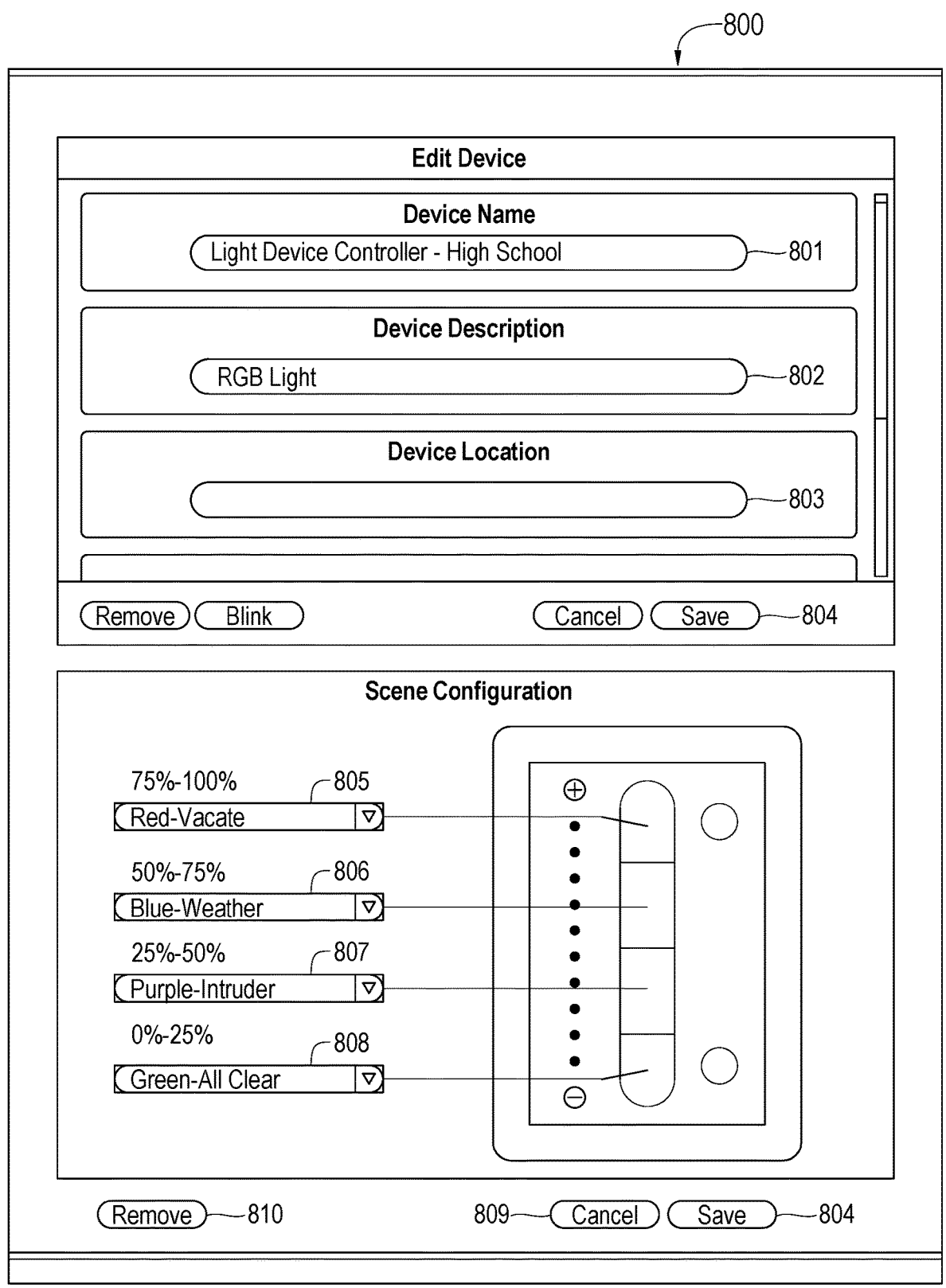
FIG. 8 is an "Edit Device" GUI of the system of FIG. 1.

FIG. 8 is an "Edit Device" GUI 800 in accordance with an embodiment of the present disclosure. The "Edit Device" GUI 800 may be displayed, for example, to the wireless device 103 (FIG. 2) or the computing device 115 (FIG. 2) by the user interface logic 367 and 467, respectively. The "Edit Device" GUI 800 enables a user (not shown) to edit a previously created device, which is stored in device data 570 (FIG. 5). Note that a device is any device that is communicatively coupled to the network 101 (FIG. 1).

In text field 801 the user enters the name of the device that the user desires to edit. Additionally, in text field 802, the user enters a device description. A device description may be a word or phrase that identifies the type of device. For example, it might be "device controller," "wall switch," or "RGB Light." This may prepopulate based upon the name of the device entered. In text field 803, the user may enter data identifying the device location. For example, the device location may be "main building" or "building 1" indicating where the device is physically located.

Furthermore, a user may configure scenes for a wall switch. In this regard, the user may select from a pulldown menu 805 a previously created scene, e.g., a color and intensity, for position one of the wall switch. In the example provided, the user has selected "Red-Vacate." The user may select from a pulldown menu 806 a previously created scene, e.g., a color and intensity, for position 2. In the example provided, the user selected "Blue-Weather." The user may select from a pulldown menu 807 a previously created scene, e.g., a color and intensity, for position 3. In the example provided, the user selected "Purple-Intruder." Also, the user may select from a pulldown menu 808 a previously created scene, e.g., a color and intensity, for position 4. In the example provided, the user selected "Green-All Clear."

What I claim is:

1. A system, comprising:
   a network comprising an automated power over ethernet (POE) switch that inherently cannot be manually actuated, the POE switch configured to only communicatively receive light-controlling commands from a light-controlling interface device;

a plurality of lights communicatively coupled to the network only via a device controller that is communicatively coupled to the POE switch and the plurality of lights only receive light-controlling commands from the device controller, simultaneously therewith the POE switch also provides power to the plurality of lights and the device controller; and a processor communicatively coupled to the POE switch, the processor configured for transmitting light-controlling data to the plurality of lights over the network via the POE switch and the device controller communicatively coupled to the POE switch, the light-controlling data comprising commands for implementing colors of the plurality of lights based upon the light-controlling data.

2. The system of claim 1, wherein the light-controlling data further comprises commands for varying the intensity of light emitted from the plurality of lights.

3. The system of claim 1, wherein the is communicatively coupled to a server, and the server is the light-controlling interface device.

4. The system of claim 3, wherein the device controller is coupled to and controls the plurality of lights.

5. The system of claim 4, wherein the server is configured to receive a light-controlling command from an access device communicatively coupled to the server.

6. The system of claim 5, wherein the access device is a wireless device.

7. The system of claim 5, wherein the access device is a computing device.

8. The system of claim 3, further comprising a wall switch communicatively coupled to the device controller and is not communicatively coupled to the POE switch.

9. The system of claim 8, wherein the device controller is configured for receiving data indicative of a color from the wall switch.

10. The system of claim 9, wherein the device controller is further configured for controlling the color of the plurality of lights based upon the data received from the wall switch.

11. The system of claim 1, comprising three lights communicatively coupled to the device controller in series.

12. The system of claim 11, wherein the device controller receives a command from an access device through a server and a POE switch, the command comprising data for controlling the color and intensity of the three lights.

13. The system of claim 1, comprising three lights communicatively coupled to a device controller in parallel.

14. The system of claim 13, wherein the device controller receives a command from an access device through a server and the POE switch, the command comprising data for controlling the color and intensity of the three lights, separately.

15. A system, comprising:
a network, the network comprising a power over ethernet (POE) switch, the POE switch configured to automatically provide power and light-controlling data to a light simultaneously;
a device controller situated electrically between the light and the POE switch, the device controller communicatively coupled to the POE switch and three lights such that the three lights are configured to receive power and light-controlling commands from the POE switch through the device controller;
an access device communicatively coupled to the POE switch via a wireless access point;
a server communicatively coupled to the POE switch; and
a processor resident on the server and configured for receiving data indicative of a light-controlling command from the access device, the processor further configured for identifying a device controller for receiving the light-controlling command and transmitting the light-controlling command to the identified device controller through the POE switch, wherein the command comprises data for controlling the color and intensity of the three lights.

* * * * *